Dec. 4, 1923.

P. BÖTTCHER, JR 1,476,044

DIFFERENTIAL GEAR FOR MOTOR CARS

Filed Dec. 16, 1921

Inventor:
Paul Böttcher, jr.,
By Knight Bros.
attys

Dec. 4, 1923.                                                           1,476,044
P. BÖTTCHER, JR
DIFFERENTIAL GEAR FOR MOTOR CARS
Filed Dec. 16, 1921                        3 Sheets-Sheet 2

Inventor:
Paul Böttcher Jr
By

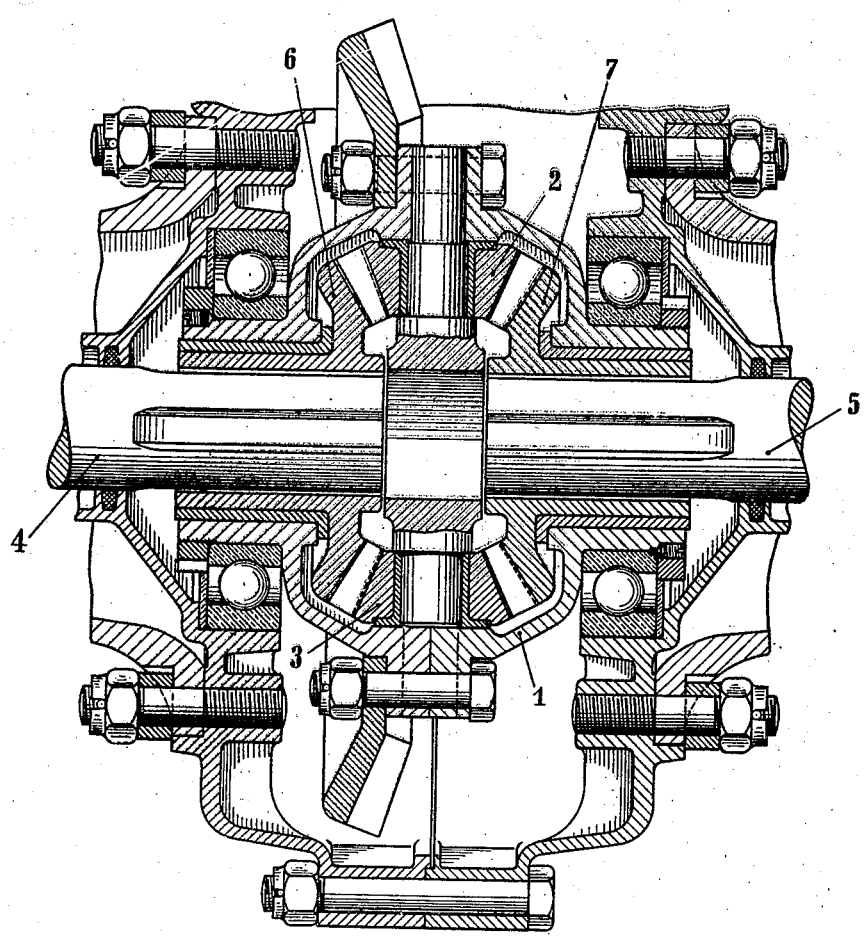

Patented Dec. 4, 1923.

1,476,044

UNITED STATES PATENT OFFICE.

PAUL BÖTTCHER, JR., OF ALTONA-BAHRENFELD, NEAR HAMBURG, GERMANY.

DIFFERENTIAL GEAR FOR MOTOR CARS.

Application filed December 16, 1921. Serial No. 522,952.

*To all whom it may concern:*

Be it known that I, PAUL BÖTTCHER, Junior, a citizen of Germany, residing at Altona-Bahrenfeld, near Hamburg, Germany, have invented certain new and useful Improvements in Differential Gears for Motor Cars, of which the following is a specification.

In order to avoid the extreme sensibility of the commonly used differential gears comprising spur- or bevel wheels it has already been proposed to complete the same or to substitute for the same worm gears, braking devices or absolute locking devices. Devices of this type complicate however the normal construction and render the same more expensive as they are liable to wear rapidly and require generally constructive alterations when being mounted in the case.

The desired insensibility against outer influences coming from the road when the car is moving in straight direction is ensured, in accordance with the present invention, merely by a novel shape of the teeth of the toothed wheels used in normal differential gears, the teeth having a concave head profile and a convex foot profile.

If two toothed wheels of the usual involute system are working together a component is produced, in accordance with the involute angle or with the inclination of the direction of pressure at pitch-line with regard to the circumference of the wheel, which tends to drive the wheels asunder. If extraordinarily great involute angles are selected this pressure component may be made correspondingly great. It may be utilized also for producing a strong friction in the end-journal-bearings of the wheel body. On the other hand a sliding between two co-operating tooth-flanks will always occur at the involute system, said sliding increasing rapidly with the distance from the pitch-circle as, at equal circumferential speed, the circumferential speed of the several points in the pitch-circle, co-operation of the head- and foot profiles of different wheels, increases or decreases with the distance of the points from the pitch-circle. Parts of the flanks at a sufficient distance from the pitch-circle work therefore always with considerable sliding and, if very great pressure-angles are selected, also with correspondingly increased pressure at pitch-line or as result with mutual friction to be selected at will. Great angles of pressure produce therefore between the tooth flanks and in the bearings extraordinarily great total friction up to complete automatical braking if all radii are accordingly selected.

It is nevertheless not possible to attain the desired result with the commonly used involute system merely by enlarging the pressure angle as it is impossible to obtain with very great pressure angles the indispensible length of the period of contact which is necessary for the correct working in avoiding shocks and in avoiding the considerable play at certain points between the flanks of the teeth. If the contact of a tooth flank has to progress gradually in a correct manner and if this contact has not to cease before it has begun again upon the adjacent tooth flank it becomes necessary to construct an absolutely new form of tooth. The peculiarities of this form of tooth consist essentially in a plane flank being very strongly inclined at its middle part, the curvature of the flank increasing much towards the head and towards the foot. This curvature towards the head and foot of the tooth is carried out in such a manner that it is accompanied by a corresponding decrease of the pressure angle. The result will therefore be a tooth with concave head profiles and with convex foot profiles. A tooth of this type will work at its middle part, owing to its peculiarly great pressure angle, with correspondingly great friction between the teeth and also on the faces between the hubs of the wheel bodies and the corresponding contact faces in the bearing case, the concave respectively convex head and foot profiles with lesser pressure angle serving mainly for ensuring a sufficiently long period of contact. With the tooth flanks of this type a convex curved part of a tooth flank works always together with a concave curved part of a tooth flank but, contrary to what happens with the cycloidal gear system, a convex head profile does not work together with a concave foot profile but inversely a concave head profile works always together with a convex foot profile.

An embodiment of the invention is shown by way of example on the accompanying drawing, wherein:—

Fig. 6 is a longitudinal section through a bevel wheel differential gear.

Fig. 1 illustrates the position when the viewed front flank of the tooth 1 of the pinion is in contact with the corresponding flank of the tooth 2 of the spur wheel, the contact is just beginning at point $E^1$ of the contact line shown in dash line. In this position the line of pressure at pitch-line intersects the centre line of the wheels at point I.

Figure 1:
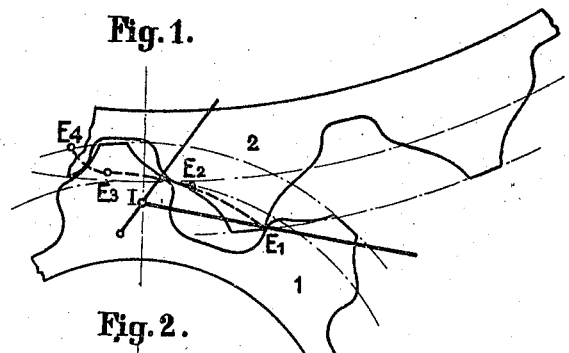
Figs. 1–4 show the teeth of a pair of wheels constructed according to the invention in the four different positions which successively occur at the working together.
Figure 2:
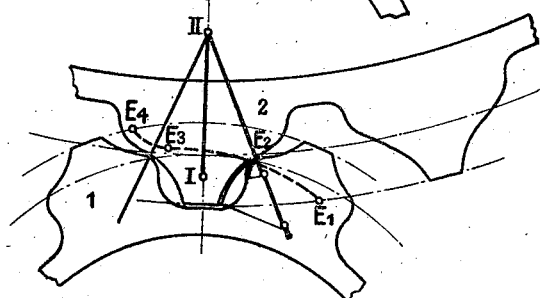

If the wheels continue to rotate the flanks roll upon one another, the contact progresses gradually upon the contact line from right to left and at the position shown in Fig. 2 it takes place at point $E^2$. At this instant the tooth 2 of the large wheel is in the medial position with regard to a centre line of the wheels. The point of intersection between the line of pressure at pitch-line and the centre line of the wheels has mounted up to point II.

Figure 3:
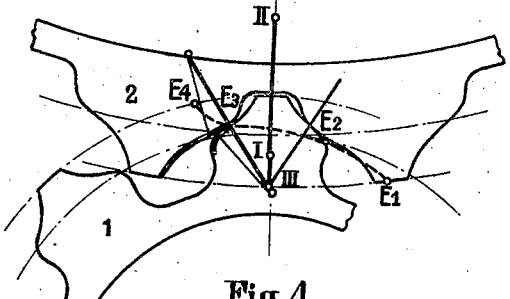

At the further rotation the position shown in Fig. 3 is reached in which the tooth 1 of the pinion is exactly in the middle position with regard to the centre line of the wheels. The contact takes place at $E^3$ and the line of pressure at pitch-line intersects the centre line of the wheels at III.

Figure 4:
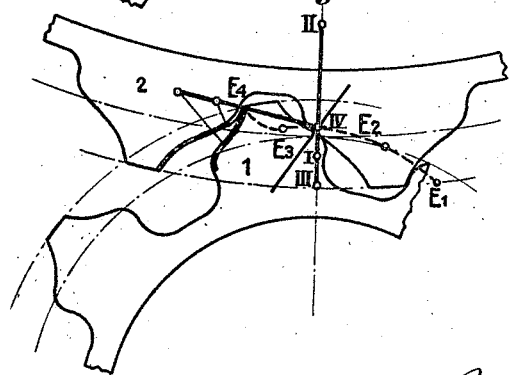

If the wheels rotate still further the position shown in Fig. 4 is assumed, the contact being at $E^4$. The point of intersection between the line of pressure at pitch-line and the centre line of the wheels has ascended already to IV. The next following tooth has come in gear in the meantime and it will roll upon its counter flank, if the rotation continues, in exactly the same manner as the tooth which has just been described.

Figure 7:
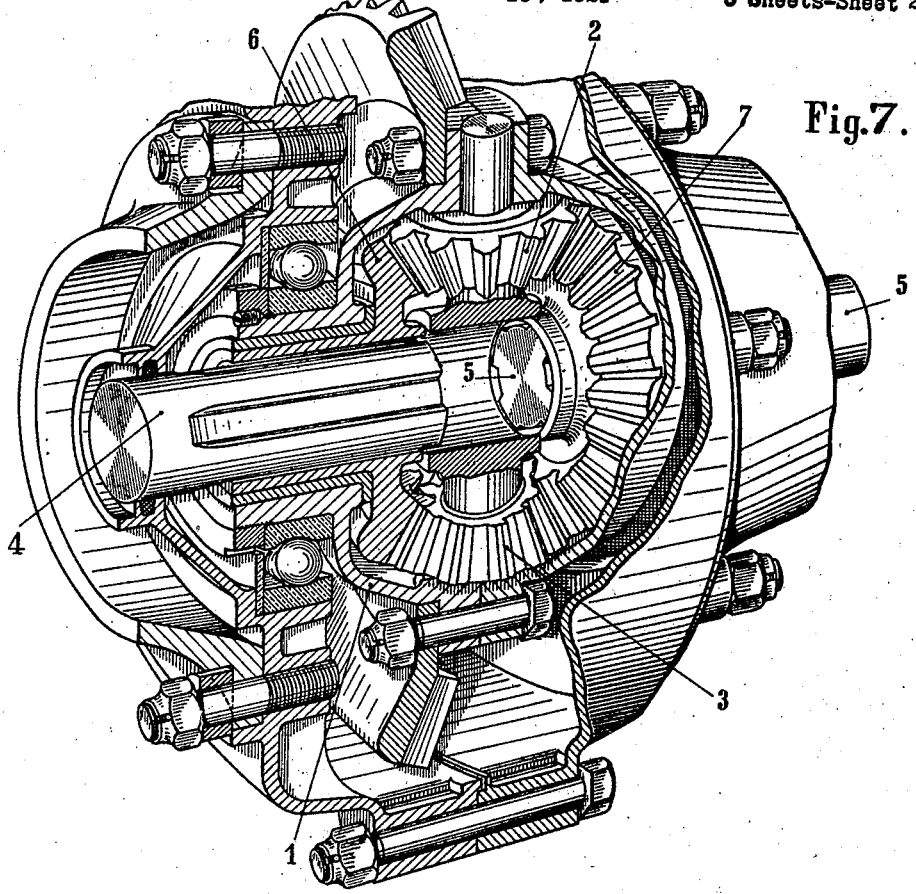
Fig. 7 is perspective view of Fig. 6.
Figure 5:
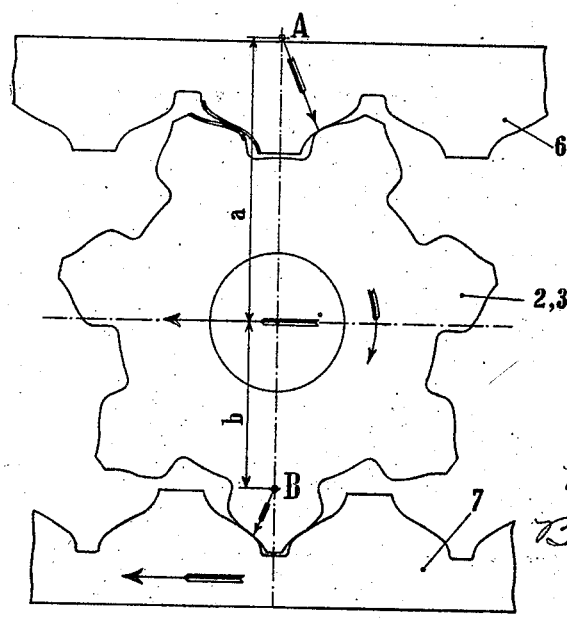
Fig. 5 shows diagrammatically the application of the teeth in a differential gear. For simplicity's sake the development of the gearing has been made instead on the face of a cone on a corresponding plane whereby the edges of the flat bevel gear wheel appear as a rack.

In the bevel wheel differential gearing shown in Fig. 5 to 7 the pinions 2 and 3 mounted in the case 1 and rotating with the same draw along each one of the large bevel wheels 6 and 7 keyed on the independent axles 4 and 5, each of said large bevel wheels driving therefore one of the back wheels. A rotation of the pinions 2 and 3 around their own axis shall take place only when the car is driving through a curve and it will produce a leading or lagging behind between the two large bevel wheels 6 and 7.

The special radii of pressure and friction in the differential gearing due to the special shape of the teeth as described produce, at a corresponding selection of all proportions, any desired degree of insensibility of the differential gearing against outer disturbing influences of the road. Any degree of efficiency for the compensating movement up to the complete automatic braking for a continuous force from the motor to the back wheels without the slightest modification of the usual general arrangement can be produced by simply substituting for the commonly used toothed wheels toothed wheels which have teeth according to the present invention.

I claim:—

In a differential gearing for motor cars the shape of the intermeshing gear teeth having concave curved head-profiles and convex-curved foot profiles.

In testimony whereof I have signed my name to this specification.

PAUL BÖTTCHER, Jr.